Patented Jan. 30, 1940

2,188,396

UNITED STATES PATENT OFFICE 2,188,396

METHOD OF PREPARING POLYVINYL HALIDE PRODUCTS

Waldo L. Semon, Silver Lake Village, Ohio, assignor to The B. F. Goodrich Company, New York, N. Y., a corporation of New York No Drawing. Application February 20, 1937, Serial No. 126,939

6 Claims. (Cl. 18—55)

This invention relates to polyvinyl halide compositions, and, more particularly, to molding or coating compositions comprising polyvinyl halides. Its principal object is to provide a method of preparing polyvinyl halide compositions which can be spread and shaped without the influence of heat.

It was shown in my U. S. Patent No. 1,929,453 that those polyvinyl halides which are insoluble in all known solvents at room temperature may be mixed with certain plasticizers under the influence of heat to form compositions which are rubbery, non-plastic materials at room temperatures. These materials can be shaped only by heating to a high enough temperature to render them plastic or fluid, or by dilution with large volumes of solvent and application of many successive coats of the dilute solution. The chief object of this invention accordingly is to provide a process for manufacturing articles made of these materials, in which the articles can be given their final shape at room temperature and either without using any or with only small proportions of volatile liquids.

I have discovered that by mixing a finely ground insoluble polyvinyl halide with a suitable proportion, say ½ to 2 or more times its weight, of a plasticizer, I form a paste which may be easily spread or shaped in any desired form. The paste is then heated to form a rubbery, non-plastic composition. The polyvinyl halide may be ground to a fine powder by any suitable means, as in a ball mill. While coarse polyvinyl halides are satisfactory for some purposes, finely-ground powders produce more homogeneous products. By the term "insoluble polyvinyl halide" I mean one which is practically insoluble in any known solvent at ordinary temperature.

The powdered material is then mixed with a plasticizing agent. In general, aromatic hydrocarbons, chlorinated or nitrated aromatic hydrocarbons, aromatic amines, aromatic or mixed aliphatic and aromatic esters, ethers, or ketones, or esters of inorganic acids, which are sufficiently non-volatile, among others, have been found to be effective materials for the purposes of this invention. The high boiling materials, such as o-nitro diphenyl ether, tricresyl phosphate, dibutyl phthalate, and butyl phthalyl butyl glycollate, are excellent plasticizers. The lower-boiling compounds such as chlorobenzene, toluene, and ethylene chloride may be used as thinning agents which will be removed by the subsequent heating operation.

I may also include in my compositions carbon black, clay, barytes, zinc oxide, wood flour, and other pigments and fillers commonly used in the rubber and plastics industries.

In practicing my invention, the proportion of plasticizer which will give a product with the desired properties after heating is mixed with the finely ground polyvinyl halide to form a paste. Pigments and fillers may be added before or after the plasticizer, though I usually prefer to add them to the polyvinyl halide before the grinding operation. If the mixture is too thick to spread easily, an organic solvent or even water may be added in which case it is often desirable to allow the solvent to evaporate before the heat treatment. The paste may then be used in a variety of ways. It may be placed in molds and cured in a heated press to give articles of any desired size and shape. Acid and solvent resistant tank linings may be made by troweling the paste onto a wire screen attached to the inside of the tank, and curing with or without a metal foil covering by means of steam, hot air, or radiant heat. The paste may be spread upon paper, wood, concrete, fabric and other surfaces and cured to give waterproof products. It will be obvious that the paste may be used in many other cases where it is possible to subject the products to a heating operation.

The following compositions illustrate specific embodiments of my invention.

Composition I

| | Parts by weight |
|---|---|
| Gamma polyvinyl chloride | 5 |
| Ortho nitro diphenyl ether | 3 |

The finely ground polyvinyl chloride was mixed with the plasticizer. Enough gasoline was added to make a paste which spread easily, and the composition was applied to cloth and heated to give a waterproof, light-resistant surface.

Composition II

| | Parts by weight |
|---|---|
| Gamma polyvinyl chloride | 5 |
| Barytes | 5 |
| Ortho nitrodiphenyl ether | 8 |

The barytes and polyvinyl chloride were ground in a ball mill and mixed with the plasticizer. One sixteenth of an inch of this composition troweled onto wire gauze, covered with aluminum foil, and cured in steam for 30 minutes at 45 pounds per sq. inch made an excellent acid and solvent resistant tank lining material.

Composition III

| | Parts by weight |
|---|---|
| Gamma polyvinyl chloride | 10 |
| Wood flour | 5 |
| Tricresyl phosphate | 12 |

This composition was mixed to form a paste, and spread with a trowel as flooring. It was changed to a rubbery composition by rolling with a heated roller. It had excellent wearing properties, and provided a surface which was not harmed when acid, oils, and solvents were spilled thereon.

Composition IV

| | Parts by weight |
|---|---|
| Gamma polyvinyl chloride | 10 |
| Ortho nitro diphenyl ether | 11 |

This composition produced molded goods having desirable properties when molded in a press for 20 minutes at 297° F.

Composition V

| | Parts by weight |
|---|---|
| 50% dispersion of gamma polyvinyl chloride in water | 10 |
| Tricresyl phosphate | 4 |

A polyvinyl chloride dispersion may be made by polymerizing a vinyl chloride emulsion. Tricresyl phosphate is added and the composition is spread upon fabric as a very thin dispersion. After the water evaporates, the application of heat gels the coat to a water resistant film.

Though I have herein disclosed specific embodiments of my invention, I do not limit myself wholly thereto, for many modifications such as the substitution of materials with equivalent properties and the variations of amounts of materials used are within the spirit and scope of my invention as defined in the appended claims.

I claim:

1. The method of preparing a resilient, rubber-like product, which comprises forming a paste by mixing at room temperature a polyvinyl halide with a composition which will dissolve the polyvinyl halide only at temperatures considerably above room temperature, imparting to the paste any desired shape, heating until the polyvinyl halide has dissolved, and causing the composition to gel by cooling it.

2. The method of preparing a resilient, rubber-like product, which comprises forming a paste by mixing at room temperature polyvinyl chloride with a composition which will dissolve the polyvinyl chloride only at temperatures considerably above room temperature, imparting to the paste any desired shape, heating until the polyvinyl chloride has dissolved, and causing the composition to gel by cooling it.

3. The method of preparing a resilient, rubber-like product, which comprises forming a paste by mixing at room temperature finely-ground polyvinyl chloride with a composition which will dissolve the polyvinyl chloride only at temperatures considerably above room temperature, imparting to the paste any desired shape, heating until the polyvinyl chloride has dissolved, and causing the composition to gel by cooling it.

4. The method of preparing a resilient, rubber-like product, which comprises forming a paste by mixing at room temperature finely-ground polyvinyl chloride with a member of the class of plasticizers consisting of aromatic, high-boiling, liquid esters, imparting to the paste any desired shape, heating until the polyvinyl chloride has dissolved, and causing the composition to gel by cooling it.

5. The method of preparing a resilient, rubber-like product which comprises forming a paste by mixing at room temperature finely-ground polyvinyl chloride and an insoluble filler with a composition which will dissolve the polyvinyl chloride only at temperatures considerably above room temperatures, imparting to the paste any desired shape, heating until the polyvinyl chloride has dissolved, and causing the composition to gel by cooling it.

6. The method of preparing a resilient, rubber-like, molded product which comprises forming a paste by mixing at room temperature finely-ground polyvinyl chloride with a composition which will dissolve the polyvinyl chloride only at temperatures considerably above room temperature, placing the paste in a mold, heating until the polyvinyl chloride has dissolved, and causing the molded article to gel by cooling it.

WALDO L. SEMON.